(12) United States Patent
Siegler (10) Patent No.: US 6,536,559 B1
(45) Date of Patent: Mar. 25, 2003

(54) GOODS LIFT

(75) Inventor: Adrian Siegler, Bellheim (DE)

(73) Assignee: Bellheimer Metallwerk GmbH, Bellheim (DE)

( * ) Notice: Subject to any disclaimer, the term of this patent is extended or adjusted under 35 U.S.C. 154(b) by 0 days.

(21) Appl. No.: 09/744,263

(22) PCT Filed: Jul. 23, 1999

(86) PCT No.: PCT/DE99/02313

§ 371 (c)(1),
(2), (4) Date: Jan. 22, 2001

(87) PCT Pub. No.: WO00/05164

PCT Pub. Date: Feb. 3, 2000

(30) Foreign Application Priority Data

Jul. 23, 1998 (DE) .......................... 198 35 033

(51) Int. Cl.⁷ ................................. B65H 1/00
(52) U.S. Cl. .................. 187/223; 414/222.02; 414/275; 414/277; 414/280
(58) Field of Search ................ 187/223, 279, 187/313, 414; 414/280, 276, 275, 277, 222.07

(56) References Cited

U.S. PATENT DOCUMENTS 3,323,661 A * 6/1967 Chasar ........................ 414/275
3,372,816 A * 3/1968 Atwater ....................... 414/275
6,056,134 A * 5/2000 Katzenschwanz ....... 414/280 X

FOREIGN PATENT DOCUMENTS

| DE | 2444891  | 11/1975 |
| DE | 2648432  | 11/1977 |
| DE | 29606381 | 6/1996  |
| FR | 2543655  | 10/1984 |

* cited by examiner

Primary Examiner—Christopher P. Ellis
Assistant Examiner—Thuy V. Tran
(74) Attorney, Agent, or Firm—Mark P. Stone (57) ABSTRACT

A storage lift has two columns, and a hoisting shaft for a conveyor unit (2) movable up and down between the two columns. A light grille (5) is arranged in the storage lift on the end of the conveyor unit (2) facing a charging and discharging opening (1). The light grille provides measurement of the height of the goods on the storage lift, and also acts as a safety element. Safety aprons (6, 7) are mounted on the top edge of the charging and discharging opening (1) and on the lower front edge of the conveyor unit (2) for compensating for shifting delays during braking of the conveyor unit (2).

22 Claims, 6 Drawing Sheets

000# GOODS LIFT

TECHNICAL FIELD

The invention relates to a storage lift having at least one charging and removal opening and a transporting unit which can be displaced vertically in a shaft between mutually opposite columns and is intended for article carriers which are to be stored, in which lift a light grille for sensing the height of the article which is to be stored is arranged at that end of the charging and removal opening which is directed toward the transporting unit, and in which lift the movement of the transporting unit during the storage and retrieval operation is automatically stopped by a safety device in the case of a foreign body which passes through the charging and removal opening penetrating into the movement path of the transporting unit.

PRIOR ART

A storage lift of the abovementioned type is known from DE 296 06 301 U1. In the known storage lift, there is arranged at the rear end of the charging and removal opening a light grille which serves alone as the sole sensor for determining the height of the article which is to be stored and, in conjunction with a corresponding control logic unit, ensures that the respective article is stored at locations where the height is as close as possible to that of the article. Light grilles which are designed for measuring the article height, unlike light barriers serving for personal protection, are usually fitted with normal, i.e. not self-testing, photocells which, on account of regulations of the trade associations for light barriers, are not authorized for personal protection. In order to protect against injuries, in particular to the hands of operators, the known storage lift is provided with two switching strips which act on safety switches and of which one is arranged above the light grille, in the charging and removal opening, and one is arranged on the bottom edge of the transporting unit. Satisfactory operation of the switching strips requires precise and durable mounting of the latter and a high level of stability in particular in the case of wide storage lifts. instead of switching strips, use is also made of light barriers which serve for personal protection, but these, unlike the light grilles for measuring the height of the article, are arranged in the front region of the charging and removal opening and, whenever operators reach into the charging and removal opening before the transporting unit is fully at a standstill, lead to so-called "emergency stops", the canceling of which naturally involves time being lost.

DESCRIPTION OF THE INVENTION

The object of the invention is to configure a storage lift of the generic type under consideration such that its light grille which is intended for determining the article height can additionally be utilized for personal-protection purposes. This object is achieved according to the invention in that the light grille is formed by a light grille with self-testing which can be utilized, during the movement cycles of the transporting unit, as part of the safety device and is authorized for personal-protection purposes, and in that, in order to compensate for delays brought about by the stopping operation of the transporting unit, said stopping operation being triggered by the light grille, safety aprons are arranged both on the top border of that region of the charging and removal opening which is directed toward the transporting unit and on the bottom border of the transporting unit, said bottom border being directed toward the charging and removal opening, and said aprons form barriers which partially bar the access to the shaft of the transporting unit and can execute yielding movements to extents which are sufficient in order for the transporting unit to be brought to a full standstill before the apron end position is reached.

In the storage lift according to the invention, the light grille performs a double function. With the transporting unit located in a rest position during the storage operation, it determines the height of the article, but, as soon as the transporting unit begins to mover it acts as part of the personal-protection device. Risks which could result from the position of the light grille at high speeds of the transporting unit are eliminated by the safety aprons in that the latter are dislocated or displaced, for example by an operator's hands passing into the danger zone, to extents which are larger than the braking paths of the transporting unit. Since the outlay for the safety aprons and the mounting thereof is considerably lower than the corresponding outlay for the installation of switching strips, the solution according to the invention has proven to be not only straightforward and elegant, but also very cost-effective. The additional costs for self-testing photocells are far outweighed by the savings which can be achieved.

Further details and features of the design according to the invention can be gathered from the subclaims and from the following description of a number of advantageous embodiments illustrated in the attached drawing.

METHODS OF IMPLEMENTING THE INVENTION

Figure 1:
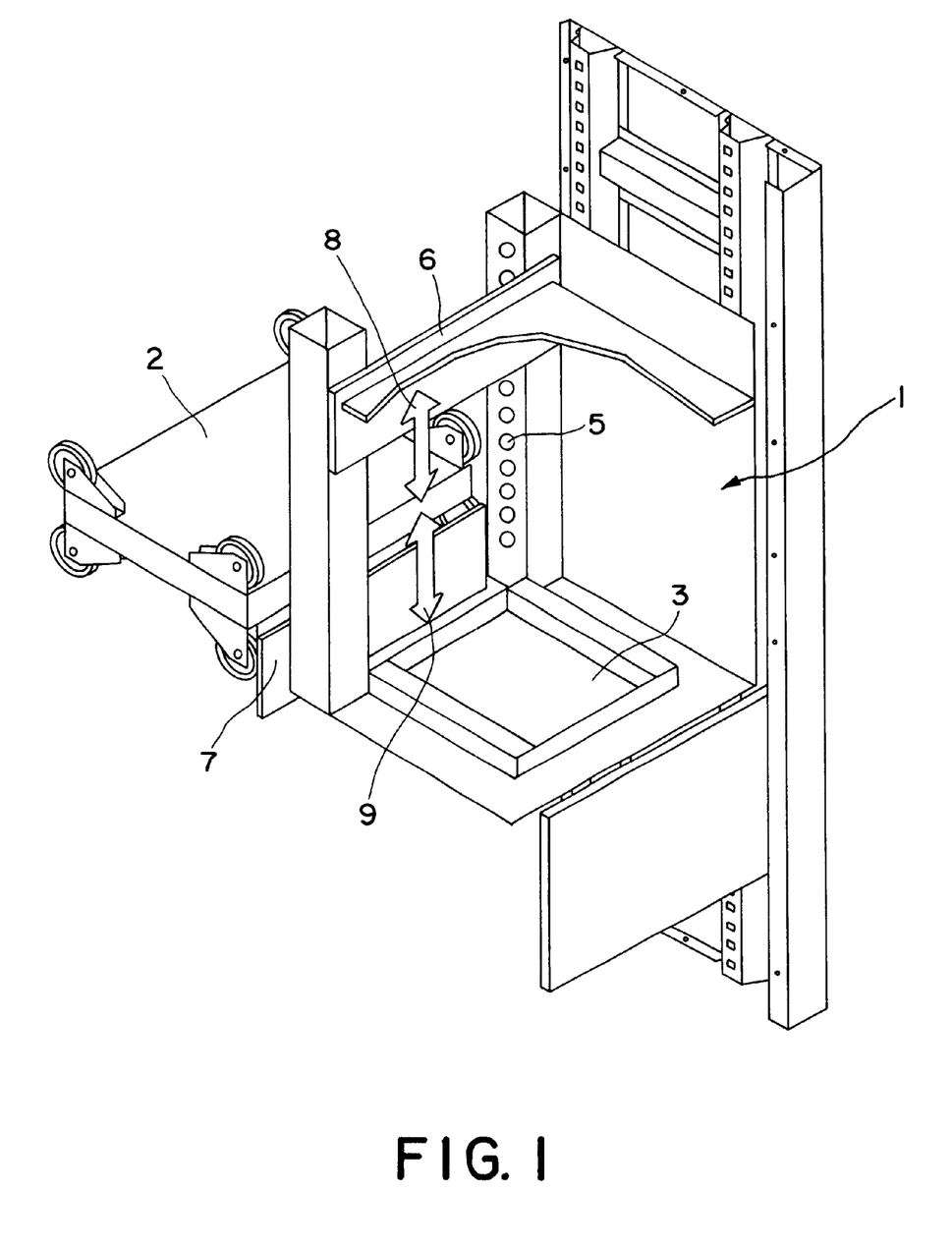
FIG. 1 shows a partial view, in perspective, of those parts of a first embodiment of a storage lift which are essential for understanding the invention.
Figure 2:
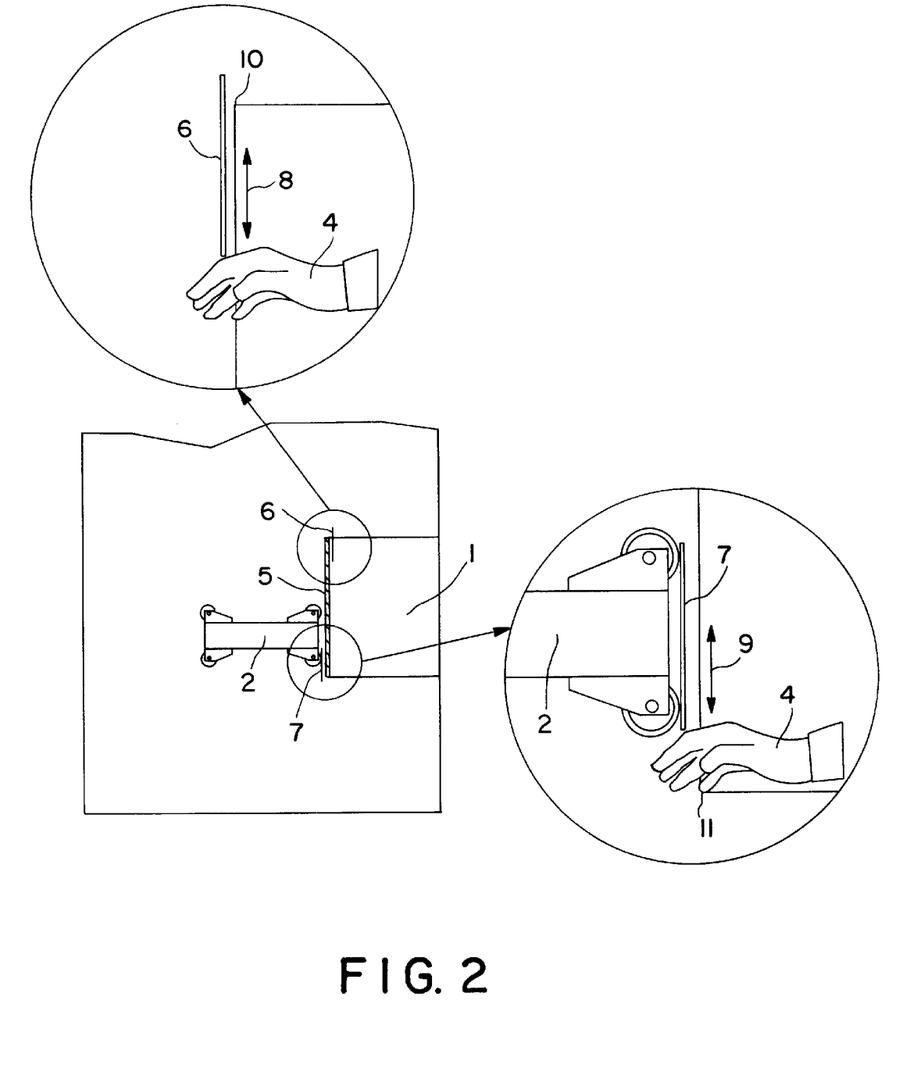
FIG. 2 shows a highly schematical illustration of the two most frequently encountered danger situations in a storage lift according to FIG. 1.

In the figures, 1 is the charging and removal opening of a storage lift with two columns, between which a conveying shaft for a transporting unit 2, which can be moved up and down, is arranged. A storage lift of this type is known from DE 296 06 381 U1. In the region of the opening 1, article carrier 3 designed as shelves can be transferred onto the transporting unit 2, which can be moved up and down, or removed from the transporting unit 2. For this purpose, the transporting unit 2 is provided with a horizontal conveying device (not illustrated) which renders superfluous the need for the storage-lift user to reach into the shaft, arranged between the columns, for the transporting unit 2. However, the case does occur time and again where the safety regulations are disregarded—as is indicated in FIG. 2—and a hand 4 reaches into the danger region. In this case, the hand 4 passes a light grille 5, which is arranged at that end of the charging and removal opening 1 which is directed toward the transporting unit 2 and, with the transporting unit 2 at a standstill in the region of the charging and removal opening 1, serves for measuring the height of the article which is to be introduced into the storage lift. In order to rule out injuries to the operator, the light grille, as has already been explained in the introduction, performs a double function in that, when the transporting unit 2 begins to move, it is utilized no longer for measuring the article height, but for interrupting the vertical movement of the transporting unit 2, i.e. as a part of a safety device. The prerequisite for such a double function is the use of a light grille which is fitted with photocells which constantly test their own functional capacity. This type of light grille for personal-protection purposes is known as such, The known light grilles of safety devices, however, are not utilized for measuring the article height and, furthermore, in order to compensate for stopping delays, are always arranged at a distance from that end of the charging and removal opening 1 which is directed toward the transporting unit 2, it being the case that—as has already been mentioned in the introduction—the number of false stops increases as the proximity of the light grille to that end of the charging and removal opening 1 which is directed toward the operator increases.

In contrast to the known safety devices, another method of compensating for the switching delay of the light grille 5 is selected for the storage lift as illustrated in the drawing. This method consists in that in each case one safety apron 6, 7 is respectively arranged on the top border of the charging and removal opening 1 and on the bottom edge of the transporting unit 2. In the case illustrated, the two safety aprons 6 and 7 can be moved vertically up and down in the direction of the double arrows 8 and 9; their displacement is selected to be at such a magnitude here that the transporting unit 2 reliably comes to a standstill before the hand 4 passes into the vicinity of the critical edges 10 and 11, which are illustrated in FIG. 2.

Figure 3:
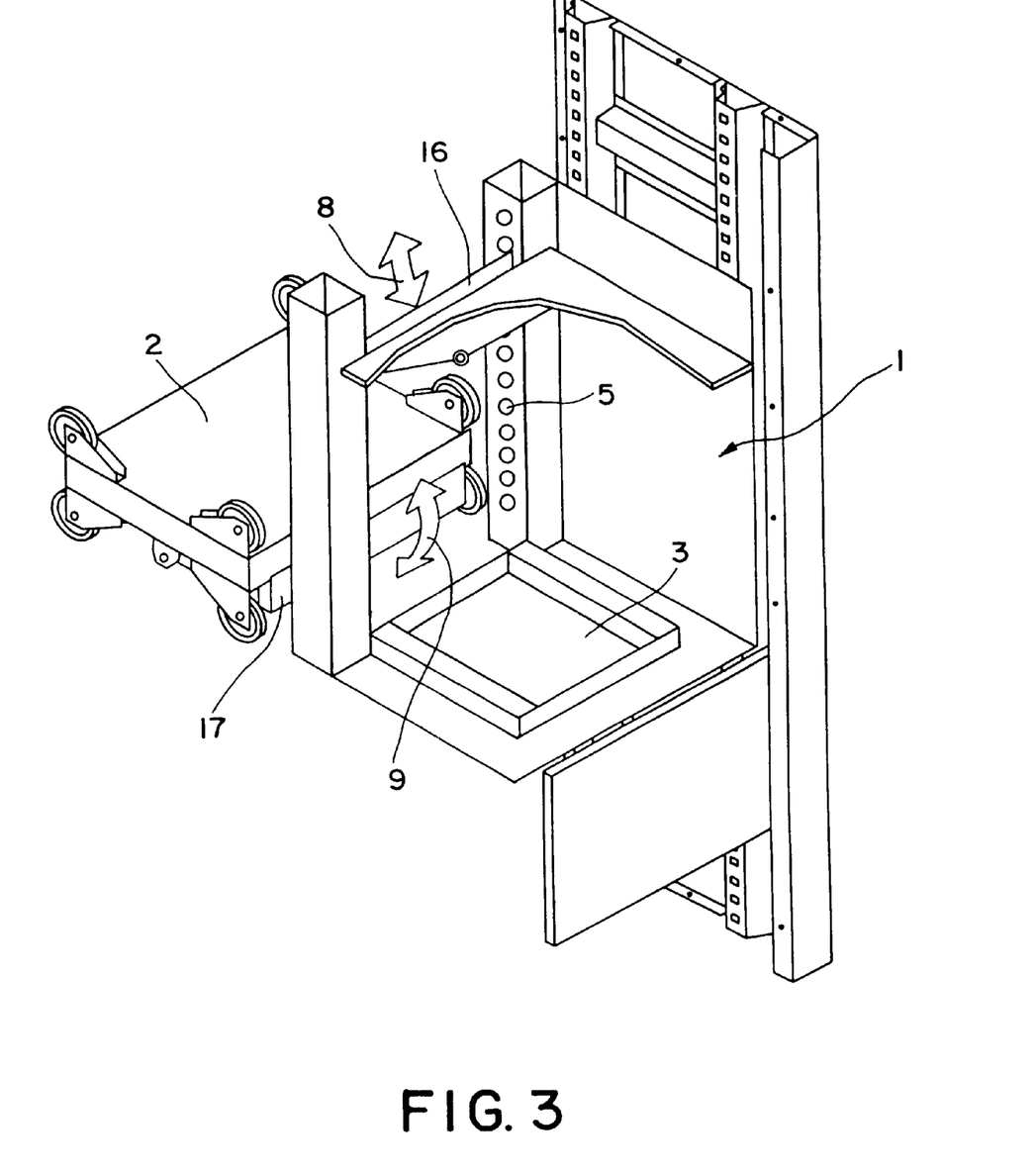
FIG. 3 shows a partial view, corresponding to FIG. 1, of a modified storage lift.
Figure 4:
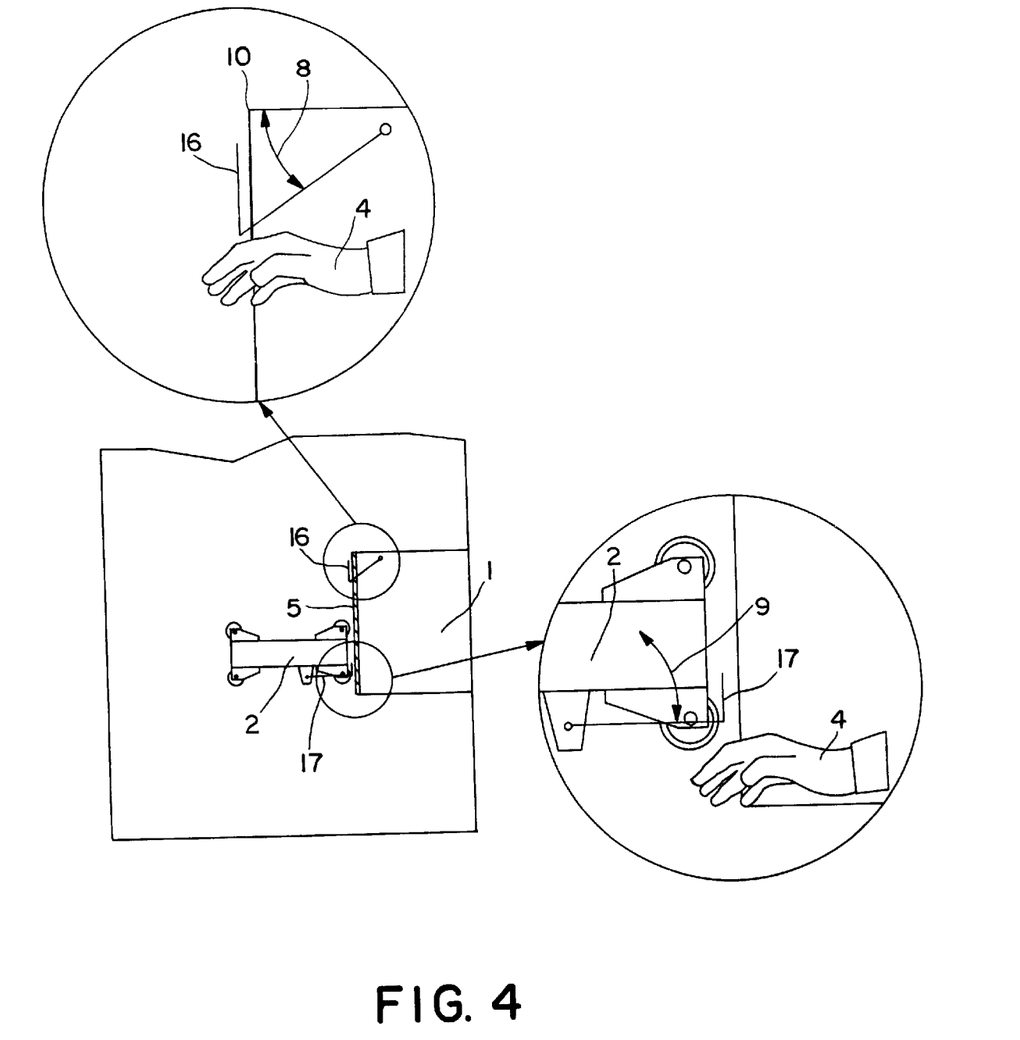
FIG. 4 shows an illustration, corresponding to FIG. 2, of the danger situations in a storage lift according to FIG. 3.

In FIGS. 3 and 4, the safety aprons 6 and 7, which can be moved up and down, are replaced by flap-like safety aprons 16 and 17 which can be pivoted back and forth in the direction of the double arrow 8 and of which the pivoting path is sufficient in order for the transporting unit 2 to be stopped during transfer from the starting position into the end position.

Figure 5:
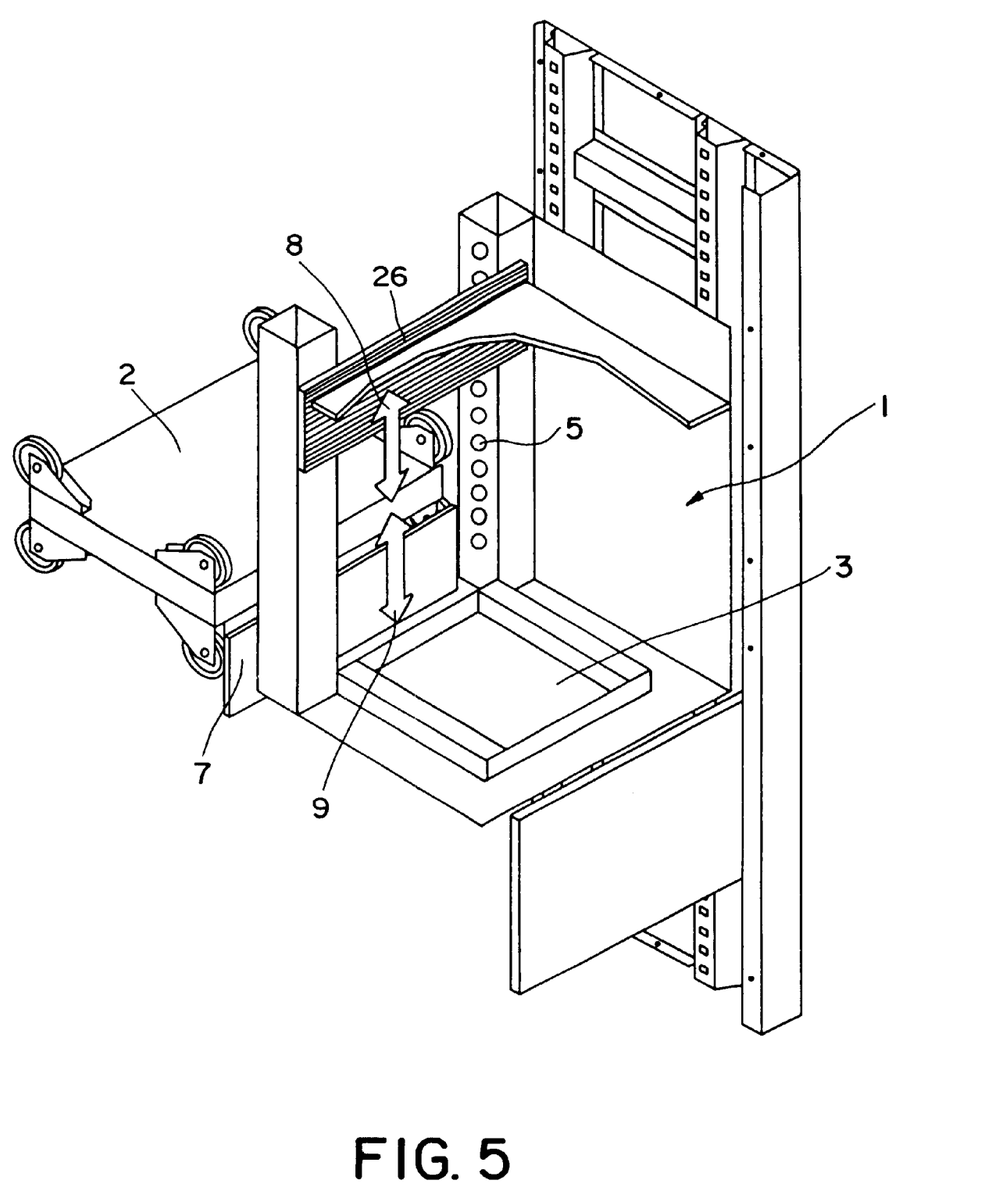
FIG. 5 shows a partial view, corresponding to FIG. 3, of a third embodiment.
Figure 6:
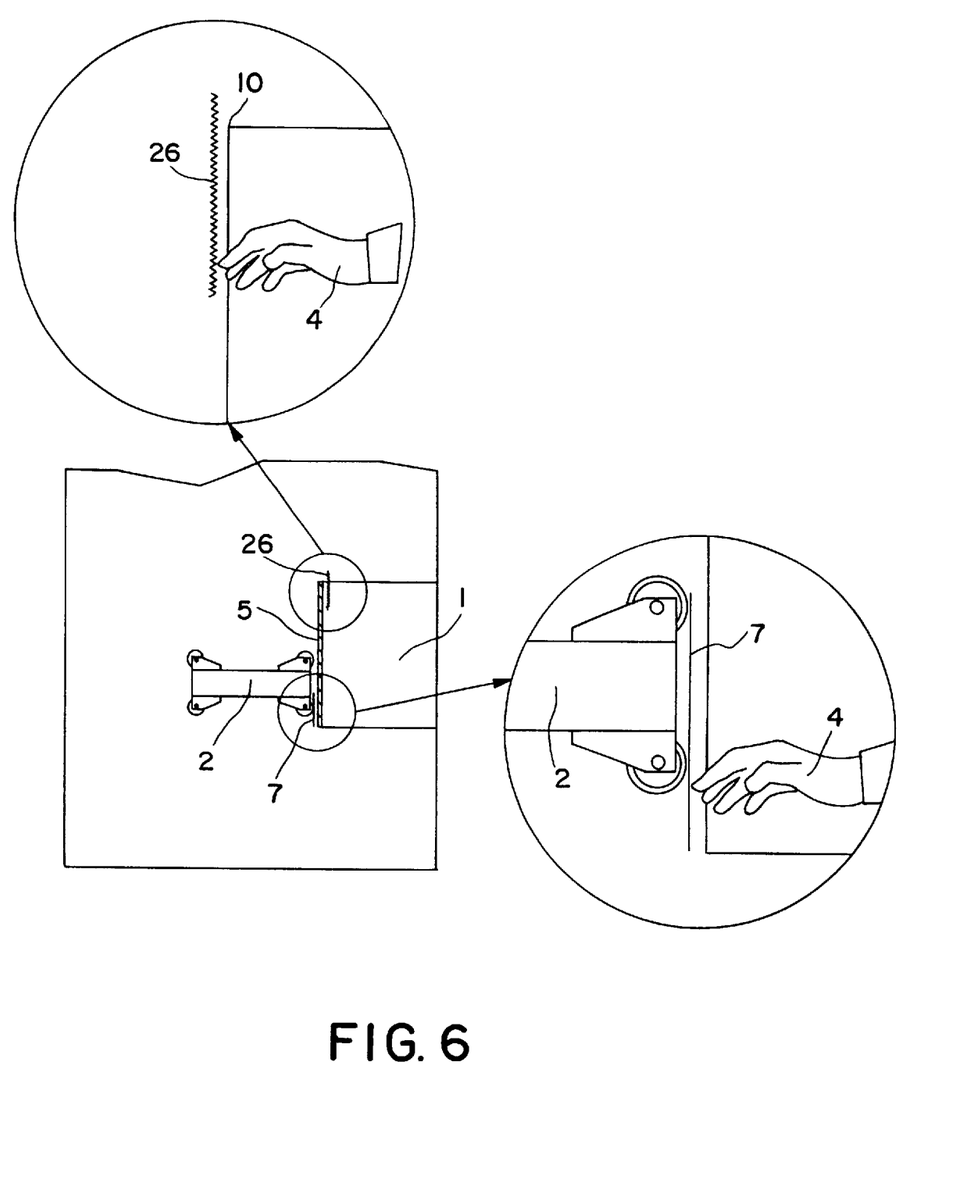
FIG. 6 shows the danger situations in a storage lift according to FIG. 5.

Finally, FIGS. 5 and 6 show a solution with a bottom safety apron 7, which can be moved up and down, and a top safety apron 26, which is of lamellar or bellows-like design. It is further possible to use safety aprons made of soft materials, such as foam, rubber or the like, which prevent anyone from gripping beneath then and rule out the occurrence of crushing.

What is claimed is:

1. A storage lift having at least one charging and removal opening (1) and a transporting unit (2), said transporting unit being vertically displaceable in a shaft defined between opposed columns, said transporting unit adapted to transport article carriers to be stored; said storage lift including a light grille (5) for sensing the height of an article to be stored, said light grille being arranged at an and of said charging and removal opening closest to said transporting unit; said storage lift including a safety device for automatically stopping movement of said transporting unit during a storage or retrieval operation, said safety device being activated to stop movement of said transporting unit in response to movement of an object through said charging and removal opening (1) and into the path of movement of said transporting unit;

wherein Said safety device comprises said light grille (5), said storage lift including a first safety apron mounted to a top border of said charging and removal opening at said end of said charging end removal opening closest to said transporting unit, and a second safety apron mounted to the bottom of an end of said transporting unit closest to said charging and removal opening; said first and second safety aprons providing barriers which partially bar access to said shaft for said transporting unit; said barriers provided by said first and second safety aprons providing sufficient time to enable said transporting unit to stop movement in said shaft before an object moves into the path of movement of said transporting unit.

2. The storage lift as claimed in claim 1, wherein said first safety apron is movable, within predetermined limits, relative to said top border of said charging and removal opening (1).

3. The storage lift as claimed in claim 2, wherein said second safety apron is movable, within predetermined limits, relative to said bottom of said transporting unit (2).

4. The storage lift as claimed in claim 1, wherein said second safety apron is movable, within predetermined limits, relative to said bottom of said transporting unit (2).

5. The storage lift as claimed in claim 1, wherein said first safety apron is Movable, within predetermined limits, in a vertical direction relative to said charging and removal opening (1).

6. The storage lift as claimed in claim 5, wherein said second safety apron is movable, within predetermined limits, in a vertical direction relative to said transporting unit (2).

7. The storage lift as claimed in claim 1, wherein said second Safety apron is movable, within predetermined limits, in a vertical, direction relative to said transporting unit (2).

8. The storage lift as claimed in claim 1, wherein said first safety apron is pivotal, within predetermined limits, relative to said charging and removal opening (1).

9. The storage lift as claimed in claim 8, wherein said second safety apron is pivotal, within predetermined limits, relative to said transporting unit (2).

10. The storage lift as claimed in claim 1, wherein said second safety apron is pivotal, within predetermined limits, relative to said transporting unit (2).

11. The storage lift as claimed in claim 1, wherein said first and second safety aprons are movable, within predetermined limits, towards each other.

12. The storage lift as claimed in claim 1, wherein said light grille (5) comprises a self-testing devices.

13. The storage lift as claimed in claim 12, wherein said first safety apron is movable, within predetermined limits, relative to said top border of said charging and removal opening (1).

14. The storage lift as claimed in claim 13, wherein said second safety apron is movable, within predetermined limits, relative to said bottom of said transporting unit (2).

15. The storage lift as claimed in claim 12, wherein said second safety apron is movable, within predetermined limits, relative to said bottom of said transporting unit (2).

16. The storage lift as claimed in claim 12, wherein said first safety apron is movable, within predetermined limits, in a vertical direction relative to said charging and removal opening (1).

17. The storage lift as claimed in claim 16, wherein said second safety apron is movable, within predetermined limits, in a vertical direction relative to said transporting unit (2).

18. The storage lift as claimed in claim 12, wherein said second safety apron is movable, within predetermined limits, in a vertical direction relative to said transporting unit (2).

19. The storage lift as claimed in claim 12, wherein said first safety apron is pivotal, within predetermined limits, relative to said charging and removal opening (1).

20. The storage lift as claimed in claim 19, wherein said second safety apron is pivotal, within predetermined limits, relative to said transporting unit (2).

21. The storage lift as claimed in claim 12, wherein said second safety apron is pivotal, within predetermined limits, relative to said transporting unit (2).

22. The storage lift as claimed in claim 12, wherein said first and second safety aprons are movable, within predetermined limits, towards each other.

* * * * *

UNITED STATES PATENT AND TRADEMARK OFFICE
CERTIFICATE OF CORRECTION

PATENT NO. : 6,536,559 B1 Page 1 of 1
DATED : March 25, 2003
INVENTOR(S) : Adrian Siegler It is certified that error appears in the above-identified patent and that said Letters Patent is hereby corrected as shown below:

<u>Column 4,</u>
Line 1, delete "Said", and substitute -- said --.
Line 26, delete "Movable", and substitute -- movable --.
Line 34, delete "Safety", and substitute -- safety --.
Line 52, delete "devices", and substitute -- device --.

Signed and Sealed this

Eighth Day of July, 2003

JAMES E. ROGAN
*Director of the United States Patent and Trademark Office*